(12) United States Patent
Koivisto et al.

(10) Patent No.: US 9,313,445 B2
(45) Date of Patent: Apr. 12, 2016

(54) FRAME FOR A VISUAL PRESENTATION DEVICE

(75) Inventors: Timo Koivisto, Helsinki (FI); Kirsi Astrén, Helsinki (FI)

(73) Assignee: INBLISS OY, Helsinki (FI)

( * ) Notice: Subject to any disclaimer, the term of this patent is extended or adjusted under 35 U.S.C. 154(b) by 265 days.

(21) Appl. No.: 13/876,208

(22) PCT Filed: Sep. 27, 2011

(86) PCT No.: PCT/FI2011/050835
§ 371 (c)(1),
(2), (4) Date: Mar. 27, 2013

(87) PCT Pub. No.: WO2012/042111
PCT Pub. Date: Apr. 5, 2012

(65) Prior Publication Data
US 2013/0186843 A1    Jul. 25, 2013

(30) Foreign Application Priority Data

Sep. 28, 2010  (FI) ...................................... 20106000

(51) Int. Cl.
*A47G 1/06*  (2006.01)
*H04N 5/64*  (2006.01)
(Continued)

(52) U.S. Cl.
CPC ................ *H04N 5/64* (2013.01); *G06F 1/1601* (2013.01); *G09F 19/12* (2013.01); *H04N 21/41415* (2013.01)

(58) Field of Classification Search
CPC .. A47G 1/0616; A47G 1/0622; A47G 1/0627
USPC ............ 40/725, 549, 781, 798, 799; 248/917, 248/918
See application file for complete search history.

(56) References Cited

U.S. PATENT DOCUMENTS

| | | |
|---|---|---|
| 6,594,144 B1 | 7/2003 | Miles |
| 6,750,922 B1 | 6/2004 | Benning |

(Continued)

FOREIGN PATENT DOCUMENTS

| | | |
|---|---|---|
| EP | 2228678 A1 | 9/2010 |
| GB | 2467847 A | 8/2010 |

(Continued)

OTHER PUBLICATIONS

Search Report for International Patent Application No. PCT/FI2011/050835; Feb. 2, 2012.

(Continued)

*Primary Examiner* — Joanne Silbermann
(74) *Attorney, Agent, or Firm* — Barnes & Thornburg LLP

(57) ABSTRACT

A frame for a visual presentation device with a substantially flat viewing area demarcated by a viewing area border. The frame includes fasteners for fastening the frame in front of the viewing area. The frame has a finite material thickness in which a transparent opening is formed. The opening has a distal end that faces the presentation device and a proximal end that faces viewers. A range of viewing positions is created in which the proximal end of the transparent opening hides the distal end and the viewing area border, and only a portion of the viewing area smaller that the viewing area in full is visible through the proximal end of the transparent opening. The frame suppresses visual clues to actual viewing distance and an enhanced illusion of watching the real world through a window is created.

12 Claims, 4 Drawing Sheets

(51) Int. Cl.
*G06F 1/16* (2006.01)
*G09F 19/12* (2006.01)
*H04N 21/414* (2011.01)

(56) References Cited

U.S. PATENT DOCUMENTS

| | | | |
|---|---|---|---|
| 6,826,863 B1 * | 12/2004 | Goodfellow | 40/725 |
| 6,993,129 B1 | 1/2006 | Barr | |
| 2001/0019662 A1 | 9/2001 | Shono | |
| 2002/0126216 A1 | 9/2002 | Schmidt | |
| 2002/0176170 A1 | 11/2002 | Huang | |
| 2003/0196365 A1 | 10/2003 | Bracker et al. | |
| 2005/0105012 A1 | 5/2005 | Kim et al. | |
| 2006/0156605 A1 * | 7/2006 | Abrams | 40/781 |
| 2006/0187624 A1 | 8/2006 | Lube | |
| 2010/0097447 A1 | 4/2010 | Tomisawa et al. | |

FOREIGN PATENT DOCUMENTS

| | | | |
|---|---|---|---|
| JP | 7067057 A | 3/1995 | |
| WO | 0117637 A1 | 3/2001 | |

OTHER PUBLICATIONS

Search Report for Finnish Patent Application No. 20106000; Jul. 25, 2011.
Supplementary European Search Report for European Application No. 11 82 8198 dated May 8, 2015.

* cited by examiner

FRAME FOR A VISUAL PRESENTATION DEVICE

PRIORITY CLAIM

This patent application is a U.S. National Phase of International Patent Application No. PCT/FI2011/050835, filed 27 Sep. 2011, which claims priority to Finnish Patent Application No. 20106000, filed 28 Sep. 2010, the disclosures of which are incorporated herein by reference in their entirety.

FIELD

Disclosed embodiments relate to visual presentation devices, such as televisions, video or computer monitors, rear-projection devices, to name just a few of the possible types of visual presentation devices. Disclosed embodiments also relate to techniques for enhancing a viewing experience of persons viewing a visual presentation device, and more particularly to techniques for providing the viewers with an enhanced illusion of watching the real world, as opposed to watching a visual presentation of the real world.

BACKGROUND

Visual presentation devices are frequently used in rooms, such as office lobbies, restaurants, hotel rooms, or the like, to create an illusion of watching the world outside that room. For example, hotel rooms and/or lobbies in skiing resorts may use visual presentation devices to show live images from skiing areas. A problem with such techniques is that experience of watching the real world is rather weak or, indeed, fake. Another way to express the problem is that viewers easily realize that they are watching a monitor instead of the real world.

Attempts have been made to integrate televisions or computer monitors with room decoration. Such techniques rely on interchangeable faceplates which replace or hide the original faceplate of the television or monitor. For example, U.S. Pat. No. 6,594,144 to Gwendolyn Miles discloses an accessory frame for a computer monitor. The purpose of the frame is to decorate the monitor and/or to support items, such as documents, pen holders or the like. While such a frame accomplishes its intended purpose of decorating the monitor, the various objects supported by the frame may actually degrade the illusion of watching the real world outside.

Disclosed embodiments alleviate one or more of the problems identified above.

SUMMARY

Disclosed embodiments provide methods and equipment as defined in the attached independent claims. The dependent claims as well as the present patent specification and drawings disclose embodiments which provide additional features and/or solve additional problems.

Disclosed embodiments provide a frame for a visual presentation device, which has a substantially flat viewing area. The viewing area is the active area of the presentation device, on which the presentation device displays images. The fact that the viewing area is substantially flat should be understood in the context of manufacturing technology. Modern display technologies, such as liquid-crystal displays (LCD), plasma displays and light-emitting diode (LED) displays have flat active areas, whereas those of cathode-ray tube (CRT) displays and rear-projection displays may be slightly curved. The active area is demarcated by a viewing area border.

In the context of the disclosed embodiments, a visual presentation device means a device operable to present a series of still or live images to viewers. The visual presentation device may also be capable of presenting audio information, but it is not mandatory.

The frame comprises fastening means for fastening the frame at a predetermined distance in front of the viewing area. In the present context "in front of the viewing area" means as seen from the direction in which the visual presentation device is viewed. In other words, the frame is closer to the viewers than the active area. The frame has a finite material thickness in which a transparent opening through the material thickness is formed. For example, the transparent opening may be a hole formed in an opaque material or a portion of transparent material surrounded by an opaque layer.

The transparent opening is dimensioned such that when the frame is fastened at the predetermined distance in front of the viewing area, the transparent opening is parallel to the viewing area or does not deviate from a plane parallel to the viewing area by more than 30 degrees, and optionally by a smaller angle, such as 20 or 15 degrees.

The transparent opening has proximal end and a distal end which are separated from each other by the material thickness, such that the distal end faces the visual presentation device and the proximal end faces its viewers. The proximal end is smaller than the distal end, as a result of which a range of viewing positions is created in which the proximal end of the transparent opening hides the distal end and the viewing area border, and only a portion of the viewing area smaller that the viewing area in full is visible through the proximal end of the transparent opening.

The inventors have discovered that such a frame positioned in front of the active area of the visual presentation device enhances the illusion that viewers are watching a distant scene in the real world, as opposed to a nearby presentation device. The inventors do not wish to commit themselves to any particular theory as to why the disclosed embodiments enhance the illusion of viewing the real world, but a plausible explanation appears to be such that a featureless frame in front of the presentation device's active area eliminates visual clues that reveal the actual viewing distance, and the viewers subconsciously estimate viewing distance by experience, based on apparent size of familiar objects. For example, if a person who is 1.8 meters tall has an apparent size of four degrees, that person is approximately 25 meters away from the viewer. People are quite accustomed to estimating distances to familiar objects based on apparent size. But most prior art presentation devices provide strong visual clues that reveal the actual viewing distance from the viewer to the presentation device. For instance, the aforementioned U.S. Pat. No. 6,594,144 suggests placing several familiar objects, such as documents, pen holders, or the like, in panels supported by the frame. The proximity of familiar objects in the immediate vicinity of the computer monitor reveals the actual viewing distance to the monitor, and the illusion of watching the real world is diminished. This is because such strong visual clues revealing the actual viewing distance override the viewer's size-based estimate of distance, and the illusion of watching the real world is destroyed. In addition to the documents and pen holders explicitly mentioned in the U.S. Pat. No. 6,594,144, such visual clues may include the borders of the monitor's active area, manufacturer logos around the active area and/or user interface elements, such as operator keys and/or indicator legends.

The inventors' hypothesis is that the frame hides or suppresses such visual clues and the viewer's experience-based estimate of distance overrides any remaining indications of the actual viewing distance.

As stated above, the frame should have a proximal surface that hide the visual clues that reveal the actual viewing distance. As a consequence, the frame itself should be reasonably free from such visual clues. This is why the transparent opening may be formed in such a manner that only the proximal end of it is visible, in addition to portion of the viewing area, and the distal end of the transparent opening and the viewing area border are hidden from view. Naturally, if the viewing direction deviates too much from the normal of the viewing area, viewers may be able to see portions of the viewing area border and the distal end of the transparent opening, but the proximal and distal ends should be dimensioned such that, taking into account the dimensions of the viewing area and the distance between the frame and the viewing area, a range of viewing positions is formed from which only the portion of the viewing area can be seen through the proximal end of the transparent opening.

The fastening means should be dimensioned such that the predetermined distance between the presentation device's active viewing area and the proximal end of the frame is large enough, so that the viewers experience different focusing distances to the frame and the viewing area. The different focusing distances for the eyes further strengthen the illusion that the images are presented at a distance other than the distance to the frame.

It is also optional to make the proximal surface of the frame as featureless as possible. For instance, the proximal end of the transparent opening can be formed in a single plane, and the proximal surface of the frame can have a uniform colour.

In at least one disclosed embodiment, the frame is of opaque material and the transparent opening is a hole formed in the opaque material, wherein the distal end of the hole is larger than the proximal end. In another disclosed embodiment the frame is of transparent material and the proximal end of the transparent opening is formed by forming a first opaque layer on a proximal side of the frame, around the transparent opening. For example, the first opaque layer can be of paint, an etched or ground portion of the transparent material, a plastic film, a metal sheet or the like. The distal end of the transparent opening is either a second opaque layer on the distal side of the frame or the border of the distal side of the frame in full.

BRIEF DESCRIPTION OF THE DRAWINGS

Disclosed embodiments will be described in connection with the attached drawings, in which like reference numerals or signs denote like items and the first digit of a reference numeral indicates the drawing in which the corresponding item is shown the first time. In the drawings.

DETAILED DESCRIPTION OF DISCLOSED EMBODIMENTS

Figure 1:
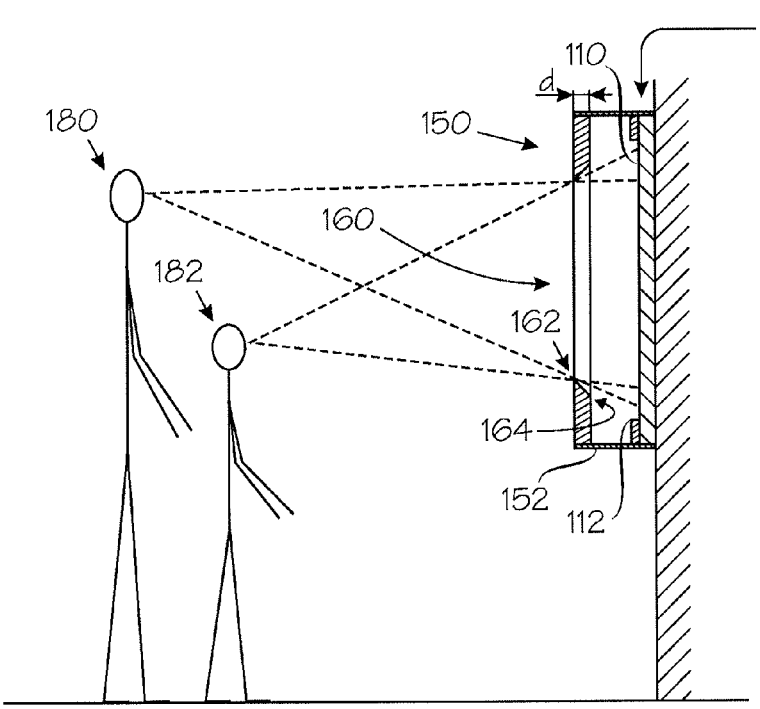
FIG. 1 is a side view of a scenario in which two viewers view a visual presentation device provided with a frame according to at least one disclosed embodiment.

FIG. 1 is a side view of a scenario in which two viewers view a visual presentation device provided with a frame according to at least one disclosed embodiment. Reference numeral 100 denotes a visual presentation device, which may be any conventional display device, such as television set, computer monitor or a rear-projection device. The visual presentation device 100 has a substantially flat viewing area or active area 110, in which the visual presentation device displays images for viewers, two of which are denoted by reference numerals 180 and 182. Depending on manufacturing technology, the viewing area may be completely flat or slightly curved. Reference numeral 112 denotes the border of the viewing area.

A frame 150 according to at least one disclosed embodiment is fastened in front of the visual presentation device 100. Reference numeral 152 summarily denotes fastening means for fastening the frame at a predetermined distance in front of the visual presentation device 100. The fastening means 152 are designed such that the frame 150 is parallel to the visual presentation device 100, and particularly to its active area 110 or deviates from such parallel alignment by less than 15 degrees.

The frame 150 has a finite material thickness denoted by reference sign d, in which a transparent opening 160 is formed. The transparent opening 160 can be considered a short tunnel the length of which equals the material thickness d. The transparent opening 160 has a proximal end 162 that faces the viewers 180, 182, and a distal end 164 that faces the visual presentation device 100. The proximal end 162 and the distal end 164 are separated from each other by the material thickness d.

As shown by the dashed lines between the viewers 180, 182 and the visual presentation device 100, a range of viewing positions is created in which the proximal end 162 of the transparent opening 160 hides the distal end 164 and the viewing area border 112, and only a portion of the viewing area smaller that the full viewing area is visible through the proximal end 162 of the transparent opening. In a case wherein the visual presentation device displays live images, the viewers 180, 182 can't see any stationary objects in the plane of the viewing area 110 through the transparent opening 160. Thus the viewers obtain the least possible number of visual clues to the actual distance to the visual presentation device 100, which is why images shown on the viewing area 110 appear to be at a distance which corresponds to the apparent size (in angular degrees) of familiar objects. Thus an enhanced illusion of viewing the real world is created, as opposed to an experience of watching a computer monitor.

FIG. 1 shows at least one disclosed embodiment in which the transparent opening 160 of the frame 150 is formed as a hole in an opaque material. In this case the transparent opening 160 is formed such that the distal end 164 is larger than the proximal end 162. As the size difference between the distal end 164 and the proximal end 162 increases, the range of viewing positions in which the proximal end 162 hides the distal end 164 increases also. The proximal end 162 and the surface of the frame 150 facing the viewers 180, 182 should optionally be free from any features that reveal the actual distance to the viewers. Such a featureless implementation may include any or all of the following: construction of the proximal end 162 and its surrounding surface in a single plane, making the edge of the proximal end 162 as sharp as possible and/or keeping the visible surface around the proximal and 162 free from features which the viewers eyes could focus on.

Figure 2:
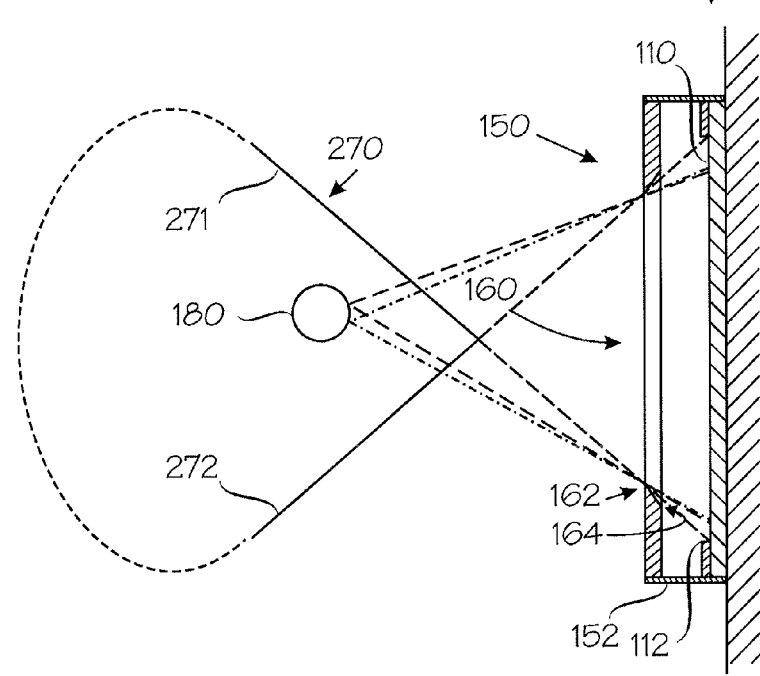
FIG. 2 is a top view of a scenario in which a slightly different view is provided to each of the two eyes of a viewer who views the visual presentation device provided with the frame shown in FIG. 1.

FIG. 2 is a top view of a scenario in which a slightly different view is provided to each of the two eyes of a viewer 180 who views the visual presentation device provided with the frame shown in FIG. 1.

FIG. 2 also illustrates the claim element according to which a range of viewing positions is created in which the proximal end of the transparent opening hides the distal end and the viewing area border, and only a portion of the viewing area smaller that the viewing area in full is visible through the proximal end of the transparent opening. Since FIG. 2 is a top view, the upper side of the drawing corresponds to the viewer's left side and vice versa. In the following, up/down refer to directions in the drawing, while left/right refer to directions as experienced by the viewer 180 facing the visual presentation device 100. As can be seen from FIG. 2, as long as the viewer 180 remains above (to the left of) line 272 in FIG. 2, they don't see the upper (left) edge of the viewing area 110 or its border 112. Conversely, as long as the viewer 180 remains below (to the right of) line 271, they don't see the lower (right) edge of the viewing area 110 or its border 112. Reference numeral 270 denotes the range of viewing positions in which the proximal end 162 of the transparent opening 160 determines the portion of the viewing area visible to the viewer. The dashed portion of the range of viewing positions is indefinite since there is no well-defined maximum distance to the visual presentation device 100.

Figure 3:
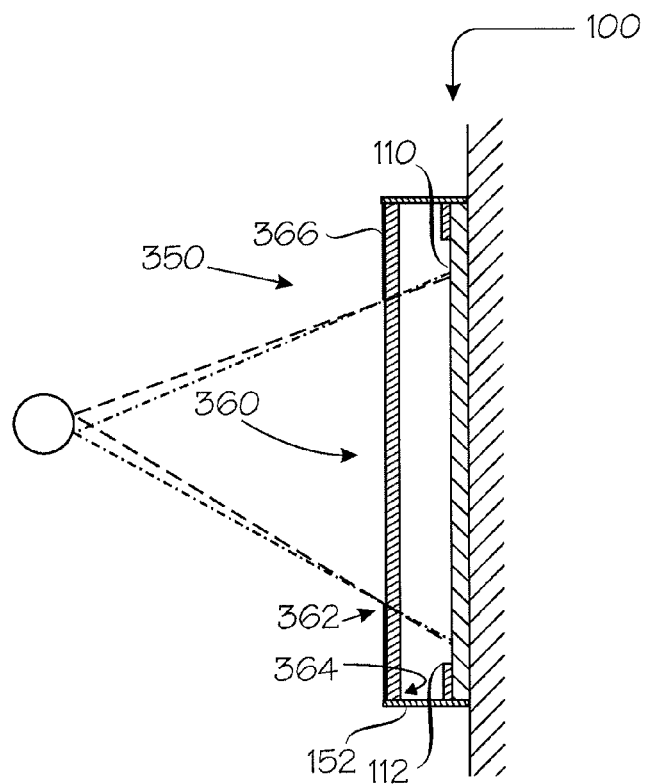
FIG. 3 is a top view of another disclosed embodiment, in which the transparent opening is formed by masking an area in a transparent material, such as glass.

FIG. 3 is a top view of another disclosed embodiment, in which the frame, denoted here by reference numeral 350, comprises transparent material, such as glass or transparent plastic. The transparent opening, denoted here by reference numeral 360, is formed by masking an area by an opaque sheet 366, such as a paint layer, an etched or ground portion of the transparent material, a plastic film, a metal sheet or the like. In this case the proximal end 362 of the transparent opening 360 is the interior border of the opaque sheet 366 (or the exterior border of the hole in that opaque sheet). In at least one disclosed embodiment, the distal end 364 of the transparent opening 360 is the distal side of the transparent material in full, although it is equally possible to arrange another opaque layer on the distal side of the transparent material.

Particularly in disclosed embodiments in which the transparent opening is not a hole but of a solid material, it may be beneficial to provide the frame 350 with adequate ventilation holes (not shown separately). Such ventilation holes may be installed in the sides of the frame that are not normally visible to the viewers, ie, sides other than the proximal side.

Figure 4:
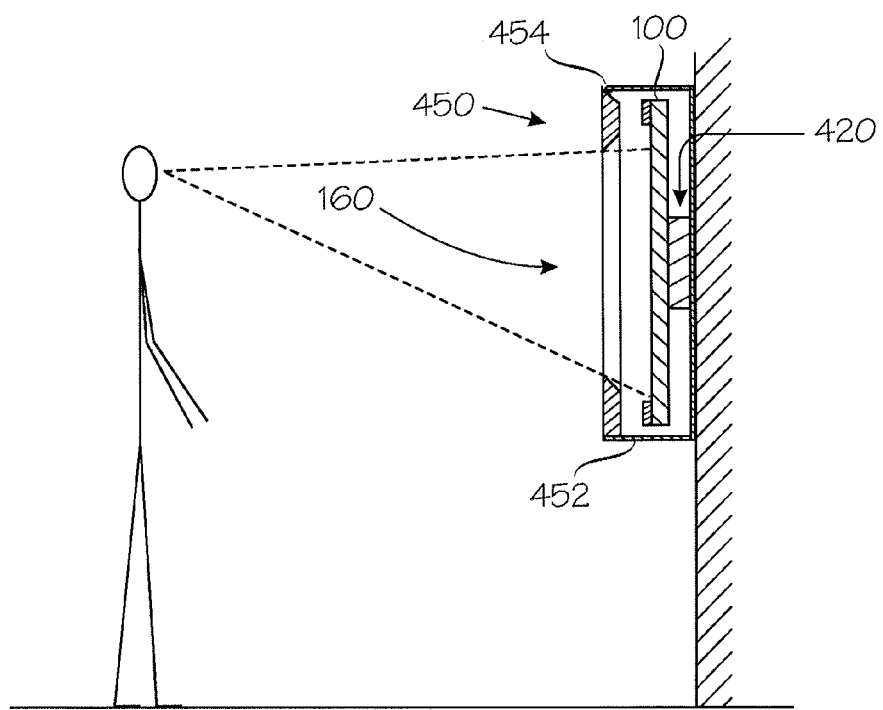
FIGS. 4 and 5 show disclosed embodiments in which the frame is fastened by utilizing a wall mount of a television or monitor.
Figure 5:
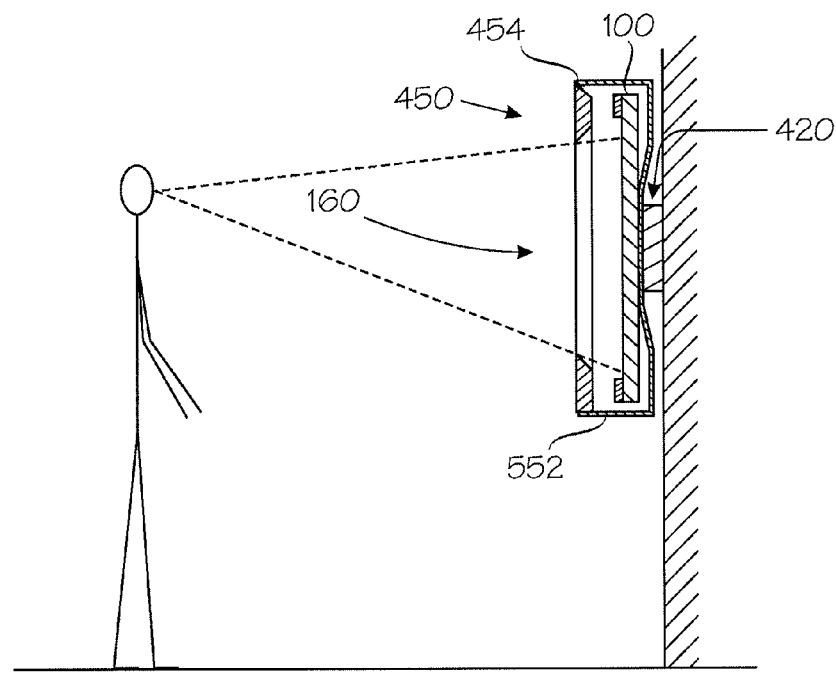

FIGS. 4 and 5 show disclosed embodiments, in which the frame is fastened by utilizing a wall mount of a television or monitor. A residual problem not discussed until now is the fact that external dimensions of television sets, monitors or rear-projection devices are not standardized. Wall mounts for flat-panel televisions and monitors have been partially standardized, however. For example, Video Electronics Standards Association (VESA) has standardized various mounting hole sets for various sizes of televisions and wall mounts.

In the disclosed embodiment shown in FIG. 4, a frame 450 has fastening means 452 which are designed to be installed between the wall mount 420 and the wall behind it. For instance, the fastening means 452 may comprise a pressed metal sheet with mounting holes whose size and spacing match those of the wall mount 420. When the wall mount 420 is screwed or bolted to the wall, the fastening means 452 of the frame 450 is installed between the wall mount 420 and the wall. Then the visual presentation device 100 is installed in the wall mount 420. Finally, the frame 450 is fastened to the fastening means 452.

At least one disclosed embodiment comprises another additional feature that can be utilized with the other disclosed embodiments as well. To facilitate cleaning the visual presentation device 100, the frame 450 is fastened to the fastening means by means of pivoting means 545, such as hinges or flexible elements, or by a detachable connection (not shown). A benefit of the pivoting means 454 is that the proximal side of the frame can be turned aside and the visual presentation device can be easily cleaned or serviced.

FIG. 5 shows an alternative version of the fastening means, denoted here by reference numeral 552. In this version the fastening means 552 is fastened between the visual presentation device 100 and the wall mount 420, in cases where this is permitted by the design of the wall mount.

Figure 6:
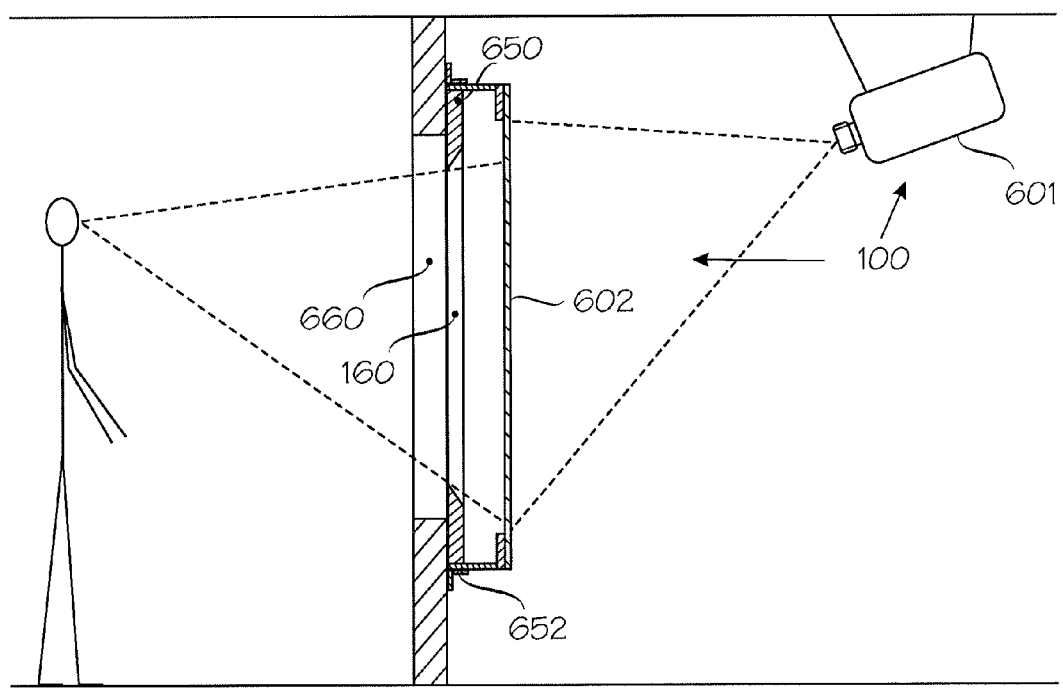
FIG. 6 shows another disclosed embodiment, in which the visual presentation device and the frame are mounted behind an opening formed in a wall.

FIG. 6 shows a disclosed embodiment, in which the visual presentation device and the frame are mounted behind an opening formed in a wall. Again, "behind a wall" means that the visual presentation device 100 and the frame, denoted here by reference numeral 650, are farther away from the viewer than the wall in which a hole 660 is formed for viewing the visual presentation device 100. In this disclosed embodiment, the visual presentation device 100 is implemented as a video projector 601 and a rear-projection screen 602. The hole 660 in the wall can be decorated like a faux window, which may comprise one pane or multiple panes, and the illusion of watching the real world behind that window can be quite strong. It is possible to arrange multiple visual presentation devices 100, each with a corresponding frame 650 and holes 660 in the wall, side by side, to emulate horizontal and/or vertical rows of windows.

The fastening means are denoted by reference numeral 652. In some implementations the visual presentation devices 100 can be supported by the fastening means 652. In other implementations the visual presentation devices are supported separately.

Figure 7:
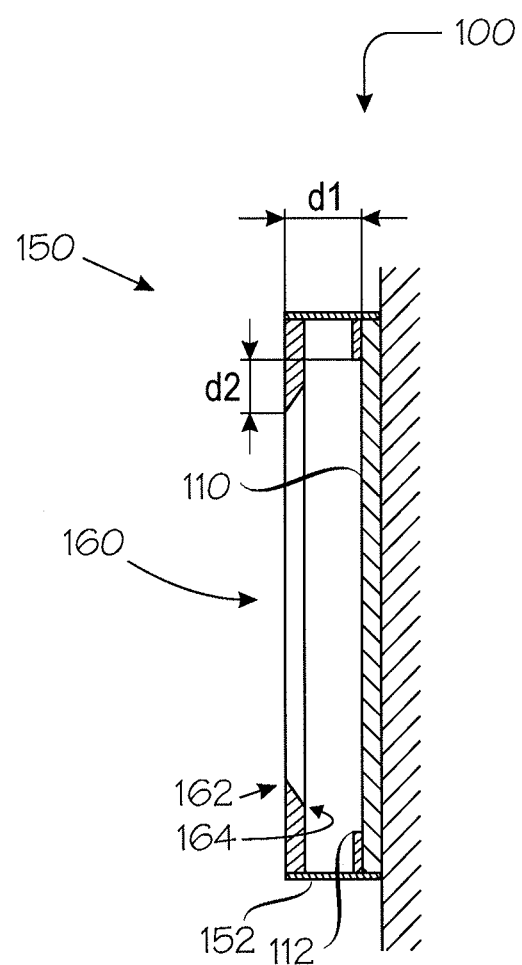
FIG. 7 illustrates dimensioning the distance between the frame and the viewing area and the size of the transparent opening in proportion to the viewing area.

FIG. 7 illustrates dimensioning the distance between the frame and the viewing area, and the size of the transparent opening in proportion to the viewing area. In FIG. 7, reference numerals 100 through 160 have been described in connection with FIGS. 1 to 3, and what has not been described previously are the two symbols d1 and d2, both of which are distances. Distance d1 is the predetermined distance in front of the viewing area 110, at which the frame 150 is fastened by the fastening means. Distance d2 is an overhang by which the transparent opening 160 of the frame 150, and particularly its proximal end 162, hides a portion of the viewing area 110, provided that the viewing area is viewed from a direction perpendicular to its surface. Determination of the distances d1 and d2 will be discussed in the following.

As regards the dimension d1, it is beneficial although not strictly necessary, to place the frame 150 at some distance in front of the viewing area, so that viewers will be able to perceive that the image shown in the viewing area 110 is not equidistant with the frame 150. The different distances to the frame 150 and viewing area 110 enhance the illusion that the image shown in the viewing area is not a flat image but a view to the real world. The dimension d1 is constrained by the following considerations. If the dimension d1 is very small, in comparison to the dimensions of the viewing area, the image shown in the viewing area 110 will be perceived equidistant to the frame 150, and the illusion or watching the real world is diminished. On the other hand, if the dimension d1 is very large, in comparison to the dimensions of the viewing area, the range of optimal viewing positions (shown as item 270 in FIG. 2) will be very small.

The inventors have experimented with various dimensions for the dimension d1 and found out that d1 is optionally between 1% and 3%, and optimally between 1.5% and 2.5% of the diagonal of the presentation device. For example, in case of a 40-inch (102 cm) presentation device, d1 is optionally between 1 and 3 cm, and optimally between 1.5 and 2.5 cm.

As regards the overhang d2, by which the frame 150, and particularly the proximal end 162 of the transparent opening 160, hides a portion of the viewing area 110, it is similarly constrained by various considerations. If the overhang d2 is very large, the transparent opening 160 will be very much smaller than the viewing area 110, and much of its area will remain hidden. The consequences are not as dramatic as with conventional information-providing displays because the disclosed embodiments are primarily targeted at applications providing an illusion of watching the real world, as opposed to two-dimensional images, and the need to hide the structure of the presentation device 100 often overrides the need to maximize the visible portion of the viewing area 110. On the other hand, if the overhang d2 is very small, it will be too easy for viewers to move to positions from which the structure of the presentation device 100 is visible and the illusion of watching the real world is diminished.

Again, the inventors have experimented with various dimensions for the dimension d2 and found out that d2 may depend on d1 and, naturally, on the dimensions of the presentation device. This is apparent from FIG. 7: the larger d1 is, the larger should d2 be to maintain a constant viewing angle from which the viewing area border 112 just remains hidden. The lower limit for d2 is optionally 50% and optimally 70% of d1, while the upper limit for d2 is optionally 150% and optimally 130% of d1.

The above description of the disclosed embodiments is illustrative rather than restrictive. It is apparent to those skilled in the art that with advancing technology, the invention can be implemented in various embodiments. Accordingly, the scope of protection is defined by the following claims.

The invention claimed is:

1. A frame for a visual presentation device, the visual presentation device having a substantially flat viewing area demarcated by a viewing area border, the frame comprising:
   fastening means for fastening the frame at a predetermined distance (d1) in front of the viewing area;
   a finite material thickness (d) in which a transparent opening through the material thickness is formed;
   wherein the transparent opening is dimensioned such that when the frame is fastened at the predetermined distance in front of the viewing area:
      the transparent opening is parallel to the viewing area within 30 degrees;
      the transparent opening has a proximal end and a distal end separated from each other by the material thickness, such that the distal end faces the visual presentation device and is closer to the visual presentation device than the proximal end; and
      a range of viewing positions is created in which the proximal end of the transparent opening hides the distal end and the viewing area border, and only a portion of the viewing area larger than zero but smaller that the viewing area in full is visible through the proximal end of the transparent opening, and
   wherein the transparent opening is optically passive.

2. The frame of claim 1, wherein the proximal end is arranged in a single plane.

3. The frame of claim 1, wherein the frame is of an opaque material and the transparent opening is a hole formed in the opaque material, wherein the distal end of the hole is larger than the proximal end.

4. The frame of claim 1, wherein the frame is of transparent material and the proximal end of the transparent opening is formed by forming a first opaque layer around the transparent opening on a proximal side of the frame, and the distal end of the transparent opening is either a second opaque layer on the distal side of the frame or an exterior border of a distal side of the frame in full.

5. The frame of claim 1, wherein the fastening means are arranged to utilize mounting holes of a wall mount for the visual presentation device.

6. The frame of claim 1, wherein the fastening means comprise pivoting means for temporarily turning aside a portion of the frame.

7. The frame of claim 1, wherein the fastening means are dimensioned such that the predetermined distance (d1) of the frame in front of the viewing area is between 1% and 3% of a diagonal dimension of the viewing area.

8. The frame of claim 1, wherein the transparent opening is one of a hole formed in an opaque material and a portion of transparent flat material surrounded by an opaque layer.

9. The frame of claim 1, wherein the transparent opening consists of optically passive elements.

10. The frame of claim 1, wherein the transparent opening is free from optically active elements.

11. The frame of claim 1, wherein the transparent opening is free from lenses.

12. A method for presenting a series of images to one or more viewers, the method comprising:
   using a visual presentation device to generate the series of images, the visual presentation device having a substantially flat viewing area demarcated by a viewing area border;
   fastening a frame at a predetermined distance in front of the viewing area and parallel to the viewing area within 30 degrees;
   the frame having a finite material thickness (d) through which an optically passive, transparent opening is formed;
   the optically passive, transparent opening having proximal end and a distal end separated from each other by the material thickness, such that the distal end faces the visual presentation device and is closer to the visual presentation device than the proximal end; and
   wherein a range of viewing positions is created in which the proximal end of the optically passive, transparent opening hides the distal end and the viewing area border, and only a portion of the viewing area larger than zero but smaller that the viewing area in full is visible through the proximal end of the optically passive, transparent opening.

* * * * *